United States Patent
Kim et al.

(10) Patent No.: US 9,880,608 B2
(45) Date of Patent: Jan. 30, 2018

(54) APPLICATION PROCESSOR FOR ADJUSTING CLOCK SIGNAL USING HARDWARE POWER MANAGEMENT UNIT AND DEVICES INCLUDING THE SAME

(71) Applicant: SAMSUNG ELECTRONICS CO., LTD., Suwon-si (KR)

(72) Inventors: Young Duk Kim, Hwaseong-si (KR); Gilles Dubost, Mougins (FR); Jinpyo Park, Yongin-si (KR); Seung Chull Suh, Yongin-si (KR); Jae Gon Lee, Yongin-si (KR); Sang Wook Ju, Hwaseong-si (KR); Jung Hun Heo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 171 days.

(21) Appl. No.: 14/840,651

(22) Filed: Aug. 31, 2015

(65) Prior Publication Data

US 2016/0062437 A1    Mar. 3, 2016

(30) Foreign Application Priority Data

Sep. 2, 2014 (KR) .................. 10-2014-0115932

(51) Int. Cl.
*G06F 1/32* (2006.01)

(52) U.S. Cl.
CPC ............ *G06F 1/324* (2013.01); *G06F 1/3228* (2013.01); *G06F 1/3287* (2013.01); *Y02B 60/1217* (2013.01); *Y02B 60/1282* (2013.01)

(58) Field of Classification Search
None
See application file for complete search history.

(56) References Cited

U.S. PATENT DOCUMENTS

| | | | |
|---|---|---|---|
| 5,155,840 A * | 10/1992 | Niijima | ............... G06F 1/32 713/400 |
| 6,751,741 B1 | 6/2004 | Kawahara et al. | |
| 2005/0108591 A1* | 5/2005 | Mendelson | ........... G06F 1/3203 713/500 |
| 2006/0123260 A1* | 6/2006 | Asada | ................... G06F 1/3203 713/320 |
| 2010/0026258 A1* | 2/2010 | Satou | ................... G06F 1/3287 323/282 |

(Continued)

FOREIGN PATENT DOCUMENTS

| | | | |
|---|---|---|---|
| JP | 2000-137699 A | 5/2000 |
| JP | 2002-109490 A | 4/2002 |

(Continued)

*Primary Examiner* — Paul J Yen
(74) *Attorney, Agent, or Firm* — Sughrue Mion, PLLC

(57) ABSTRACT

An application processor includes a central processing unit (CPU), intellectual properties (IPs), a hardware power management unit (PMU) configured to determine whether the application processor is in system idle based on a first idle signal output from the CPU and output control signals as a result of the determination, and a clock signal supply control circuit configured to change an output signal supplied to the CPU and the IPs from clock signals to an oscillation clock signal, based on the control signals. The oscillation clock signal has a frequency lower than that of the clock signals.

19 Claims, 10 Drawing Sheets

(56) References Cited

U.S. PATENT DOCUMENTS

| | | | |
|---|---|---|---|
| 2011/0055434 A1* | 3/2011 | Pyers | ............ G06F 1/3203 |
| | | | 710/14 |
| 2013/0232364 A1 | 9/2013 | de Cesare et al. | |
| 2014/0101478 A1 | 4/2014 | Tal et al. | |

FOREIGN PATENT DOCUMENTS

| | | |
|---|---|---|
| JP | 2003-323400 A | 11/2003 |
| JP | 2005-18662 A | 1/2005 |
| KR | 10-2005-0117788 A | 12/2005 |
| KR | 10-2009-0022662 A | 3/2009 |
| KR | 10-2014-0038737 A | 3/2014 |

* cited by examiner

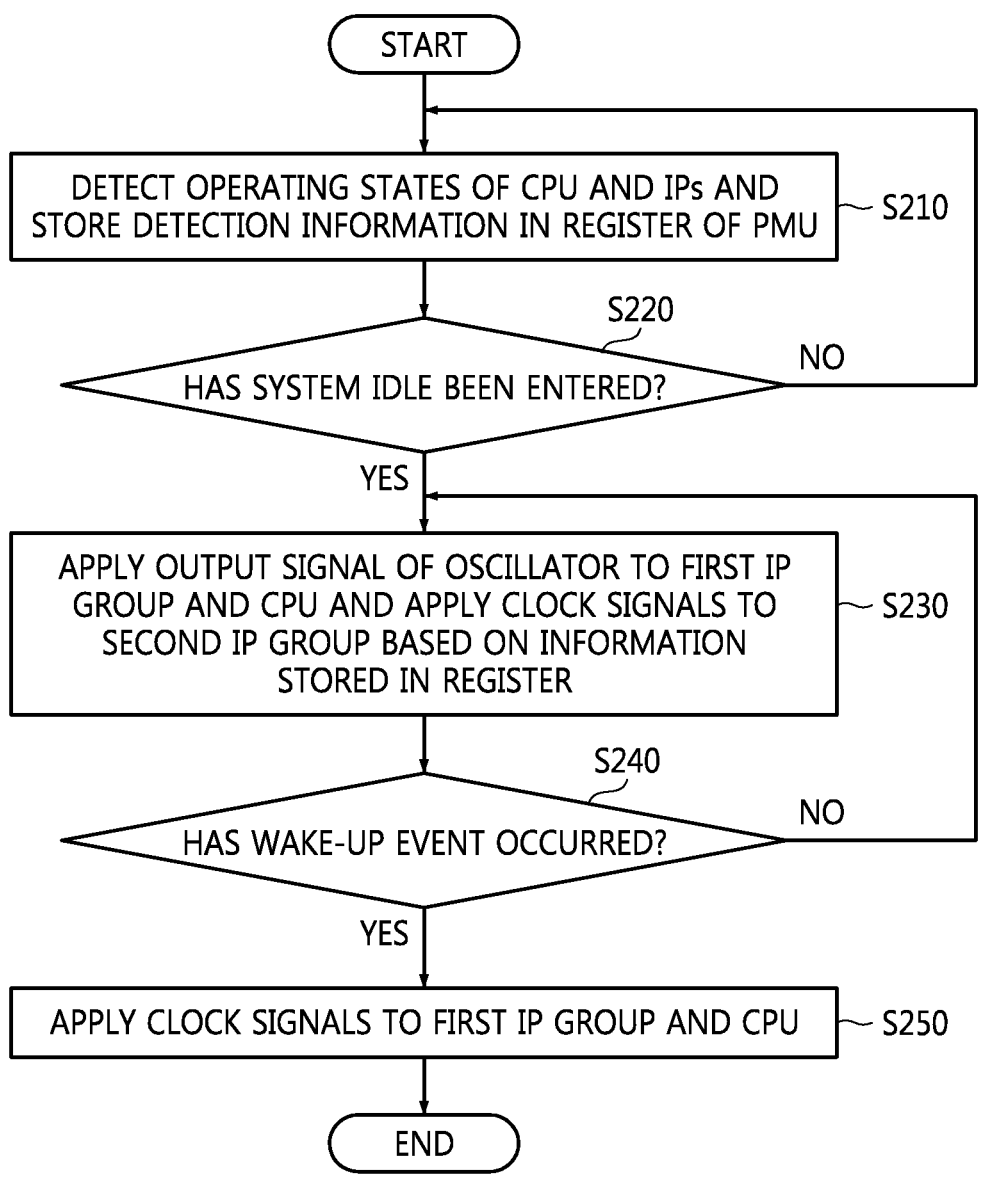

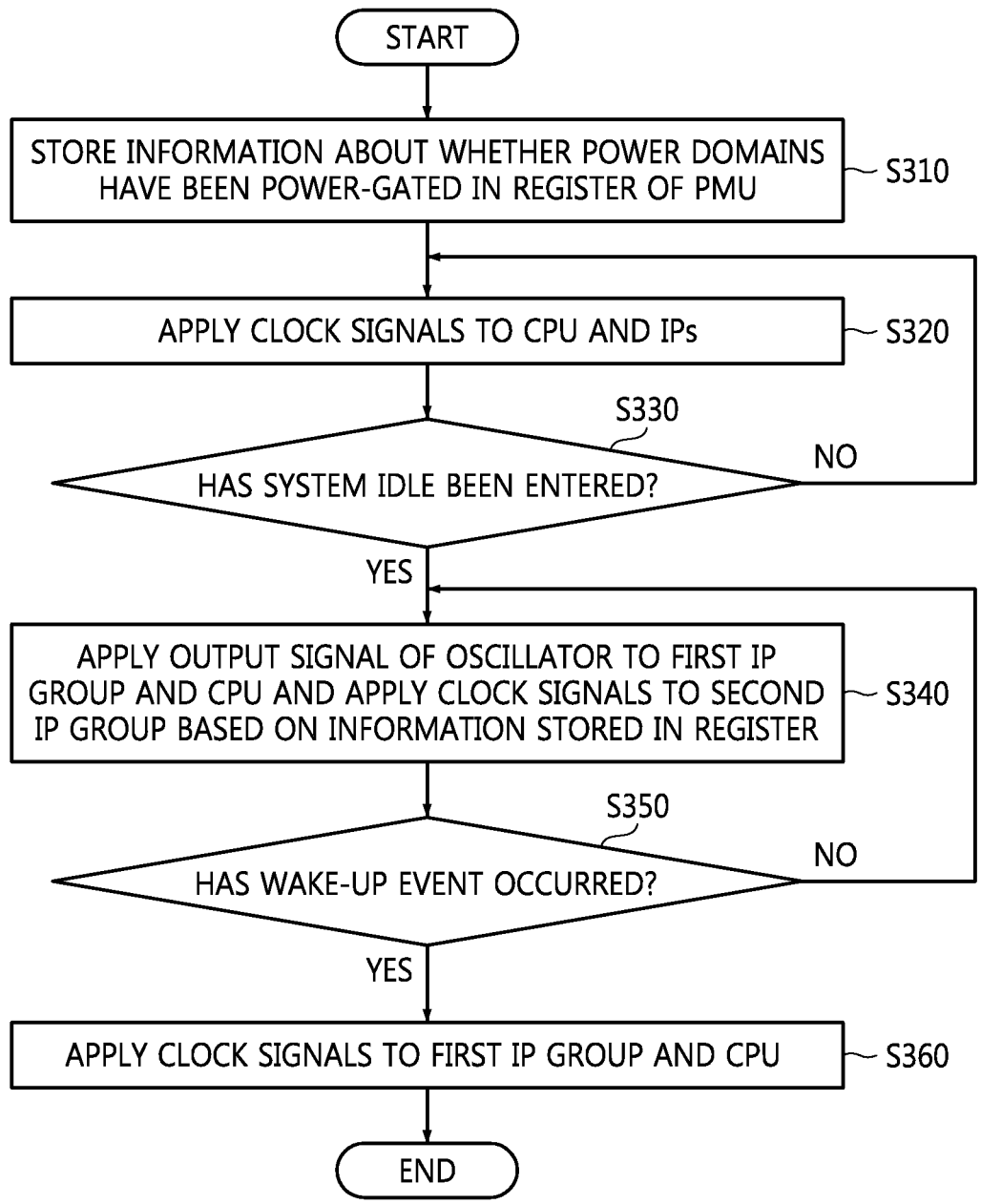

APPLICATION PROCESSOR FOR ADJUSTING CLOCK SIGNAL USING HARDWARE POWER MANAGEMENT UNIT AND DEVICES INCLUDING THE SAME

CROSS-REFERENCE TO THE RELATED APPLICATIONS

This application claims priority from Korean Patent Application No. 10-2014-0115932 filed on Sep. 2, 2014, the disclosure of which is incorporated herein in its entirety by reference.

BACKGROUND

Apparatuses and methods consistent with exemplary embodiments of the inventive concept relate to an integrated circuit, and more particularly, to an application processor for changing a clock signal used in an integrated circuit into a clock signal of an oscillator using a hardware power management unit when the integrated circuit is in system idle and devices including the same.

Dynamic voltage and frequency scaling (DVFS) is a technique whereby an operating frequency and an operation voltage are dynamically adjusted. Electronic systems can reduce unnecessary power consumption using DVFS. In most commonly used DVFS, the usage of a target circuit is periodically checked and an operating frequency and voltage applied to the target circuit are adjusted according to the check result to reduce unnecessary power consumption of the target circuit.

DVFS performed based on a result of checking the usage of a target circuit during the operation of an electronic system including the target circuit can reduce current consumption at the electronic system to some extent and sustain the performance of the electronic system. However, when DVFS is performed based on the result of checking the usage of the target circuit while the electronic system is in a system idle state, DVFS itself adversely affects current consumption at the electronic system. Recently, a system on chip (SoC) supports a low-power mode in order to increase the use time of batteries. When a central processing unit (CPU) periodically wakes up in a SoC using the low-power mode in order to perform DVFS, power consumption of the CPU takes a significantly large part of the entire power consumption of the SoC.

SUMMARY

Exemplary embodiments of the inventive concept provide an application processor which supplies a clock signal of an oscillator instead of a clock signal used in an integrated circuit by using a hardware power management unit when the integrated circuit is in system idle, and devices including the same According to some exemplary embodiments of the inventive concept, there is provided an application processor which may include a central processing unit (CPU), intellectual properties (IPs), a hardware power management unit (PMU) configured to determine whether the application processor is in system idle based on a first idle signal output from the CPU and output control signals as a result of the determination, and a clock signal supply control circuit configured to change an output signal supplied to the CPU and the IPs from clock signals to an oscillation clock signal, based on the control signals. The oscillation clock signal has a frequency lower than that of the clock signals.

Each of the IPs may transmit a second idle signal to the hardware PMU, and the hardware PMU is configured to output the control signals based on the first idle signal and the second idle signal.

The CPU may detect whether each of the CPU and the IPs is in an idle state and may transmit the first idle signal to the hardware power management unit.

The first idle signal may be set by the CPU in a register included in the hardware power management unit and the hardware power management unit may output the control signals based on the first idle signal set in the register. The first idle signal may indicate whether each of the IPs has been power-gated.

According to other exemplary embodiments of the inventive concept, there is provided a system on chip (SoC) which may include at least one first type IP comprising a CPU, at least one second type IP, a PMU configured to determine whether the SoC is in system idle based on an operating state of the first type IP and generate a control signal as a result of the determination, and a clock signal supply control circuit configured to change an output signal supplied to the at least one first type IP from a first clock signal to an oscillation clock signal, based on the control signal. The oscillation clock signal may have a frequency lower than that of the first clock signal.

The at least one first type IP may include a plurality of first type IPs. Each of the first type IPs may transmit an idle signal to the hardware power management unit. The hardware power management unit may determine the operating states of the first type IPs based on the idle signal from each first type IP and may output the control signal as a result of the determination of the operating states.

The system on chip may further include exclusive lines configured to transmit the idle signal from each of the first type IPs to the hardware power management unit.

The CPU may detect its operating state and an operating state of each of the other first type IPs and transmit detection information to the hardware power management unit. The hardware power management unit may determine the operating state of the first type IPs based on the detection information and output the control signal as a result of the determination of the operating states.

The detection information may be set by the CPU in a register included in the hardware power management unit. The hardware power management unit may output the control signal based on the detection information set in the register.

The operating state of each of the first type IPs except for the CPU may indicate whether each first type IP has been power-gated. The hardware power management unit may output the control signal based on an idle signal from the CPU and whether each of the first type IPs except for the CPU has been power-gated.

The clock signal supply control circuit may include an oscillator configured to generate the oscillation clock signal and a clock signal generator configured to generate the first clock signal. The clock signal supply control circuit may turn off the clock signal generator after the oscillation clock signal is applied to the at least one first type IP.

The clock signal supply control circuit may further include a plurality of selectors. One of the selectors may apply one of the first clock signal and the oscillation clock signal to one of the at least one first type IP in response to one of selection signals output from the hardware power management unit.

The hardware power management unit may turn on the clock signal generator, which has been turned off, in response to an interrupt signal and may apply the first clock signal to the at least one first type IP.

The hardware power management unit may maintain second clock signal applied to the second type IP in response to the control signal. The frequency of the oscillation clock signal may be lower than that of the second clock signal.

According to further exemplary embodiments of the inventive concept, there is provided a mobile device which may include an SoC in which the above application processor is included, a memory connected to the SoC, and a display connected to the SoC. The application processor may include a memory controller configured to control an operation of the memory and a display controller configured to control an operation of the display. The display controller may communicate with the display through a display serial interface.

According to still further exemplary embodiments of the inventive concept, there is provided an integrated circuit which may include a CPU, an intellectual property (IP); a power manager configured to determine an operating state of at least the CPU among the CPU and the IP; and a clock signal supply control circuit configured to supply a clock signal or an oscillation signal to each of the CPU and the IP based on the determination. Here, the power manger may determine an operating state of the CPU without determining an operating state of the IP, and, in response to the determination that the CPU is in an idle state, the clock signal supply control circuit may supply the oscillation clock signal to the CPU. Also, in response to the determination that the CPU is in an idle state, the clock signal supply control circuit may supply the oscillation clock signal to the CPU and, regardless of a result of the determination, supply the clock signal to the IP.

BRIEF DESCRIPTION OF THE DRAWINGS

The above and other aspects of the inventive concept will become more apparent by describing in detail exemplary embodiments thereof with reference to the attached drawings, in which:

FIG. 9 is a flowchart of an operation of an integrated circuit, according to other exemplary embodiments of the inventive concept; and FIG. 10 is a flowchart of an operation of an integrated circuit, according to further exemplary embodiments of the inventive concept.

DETAILED DESCRIPTION OF THE EXEMPLARY EMBODIMENTS

Figure 1:
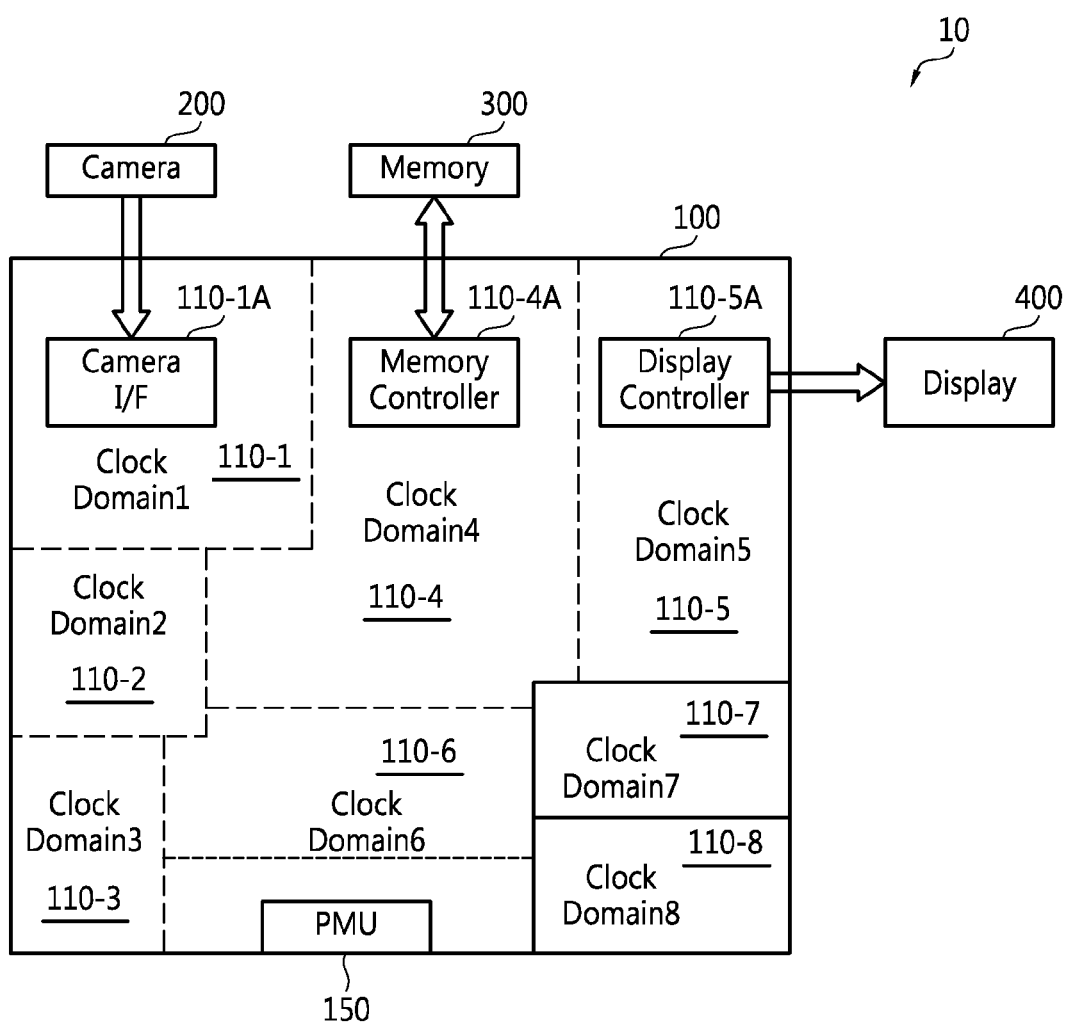
FIG. 1 is a schematic block diagram of a mobile device, according to some embodiments of the inventive concept.

The inventive concept now will be described more fully hereinafter with reference to the accompanying drawings, in which exemplary embodiments of the inventive concept are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a schematic block diagram of a mobile device 10, according to some exemplary embodiments. Referring to FIG. 1, the mobile device 10 may be a portable electronic device using a battery for an operating voltage.

The portable electronic device may be a laptop computer, a cellular phone, a smart phone, a tablet personal computer (PC), a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a multimedia device, a wearable computer, an Internet of things (IoT) device, an Internet of everything (IoE) device, or an e-book.

The mobile device 10 may include an integrated circuit 100, a memory 300, and a display 400. The mobile device 10 may also include a camera 200.

The integrated circuit 100 may be a controller or processor that controls the operations of the mobile device 10. The integrated circuit 100 may be implemented as a system on chip (SoC), an application processor (AP), a mobile AP, or a control chip.

Here, "system idle" indicates a state in which all or part of the integrated circuit 100 is entirely or nearly entirely idling or in an idle mode in order to reduce power consumption of the integrated circuit 100. The integrated circuit 100 may enter the system idle when, instead of a plurality of clock signals, an oscillation clock signal of an oscillator is supplied to all or part of the integrated circuit 100. The frequency of the oscillation clock signal is lower than that of each of the clock signals.

The integrated circuit 100 may include a plurality of clock domains 110-1 through 110-8 and a hardware power management unit (PMU) or power manager 150. The integrated circuit 100 may include one or more circuits that do not use a clock signal, but these circuits are not illustrated in FIG. 1 for clarity of the description.

Each of the clock domains 110-1 through 110-8 may include at least one intellectual property (IP) which operates using a clock signal applied to each clock domain. Here, an IP is a function block integrated into the integrated circuit 100. The IP may be a central processing unit (CPU), a graphics processing unit (GPU), a processor, a core of a multi-core processor, memory, a universal serial bus (USB), a peripheral component interconnect (PCI), a digital signal processor (DSP), a wired interface, a wireless interface, a controller, embedded software, codec, a video module (e.g., a camera interface, a Joint Photographic Experts Group (JPEG) processor, a video processor, or a mixer), a three-dimensional graphics core, an audio system, or a driver. In other words, a hardware IP may be a function block used in the integrated circuit 100 and the function block may be a hardware module with unique features.

The clock domains 110-1 through 110-8 may be divided into first clock domains 110-1 through 110-6 including a first type IP and second clock domains 110-7 and 110-8 including a second type IP. Clock signals applied to the respective clock domains 110-1 through 110-8 have different frequencies.

In a normal operation, each clock signal is applied to each of the first clock domains 110-1 through 110-6 according to the control of the hardware PMU 150. In system idle, an oscillation clock signal output from an oscillator is applied to the first clock domains 110-1 through 110-6 according to the control of the hardware PMU 150. The frequencies of the respective clock signals are higher than that of the oscillation clock signal. Accordingly, in system idle in which the oscillation clock signal is applied to the first clock domains 110-1 through 110-6, the power consumption of the integrated circuit 100 is reduced.

However, in both the normal operation and the system idle, each clock signal is applied to each of the second clock domains 110-7 and 110-8. In other words, even in system idle, the clock signals instead of the oscillation clock signal are respectively applied to the second clock domains 110-7 and 110-8. For example, an external connectivity IP may be formed in each of the second clock domains 110-7 and 110-8.

A memory controller 110-4A included in the fourth clock domain 110-4 may control an access (e.g., a write operation or a read operation) to the memory 300. The memory 300 may be formed with a dynamic random access memory (DRAM), a flash memory, an embedded multimedia card (eMMC), or a universal flash storage (UFS).

A display controller 110-5A included in the fifth clock domain 110-5 may control the operations of the display 400. In some embodiments, the display controller 110-5A may support mobile industry processor interface (MIPI®) display serial interface (DSI), embedded DisplayPort (eDP) interface, or high definition multimedia interface (HDMI), but the inventive concept is not restricted to these examples.

When the mobile device 10 includes the camera 200, the integrated circuit 100 may also include a camera interface 110-1A. The camera interface 110-1A included in the first clock domain 110-1 may process image data output from the camera 200. For example, the camera interface 110-1A may support MIPI® camera serial interface (CSI).

The camera interface 110-1A, the memory controller 110-4A, and the display controller 110-5A are examples of IPs.

Figure 2:
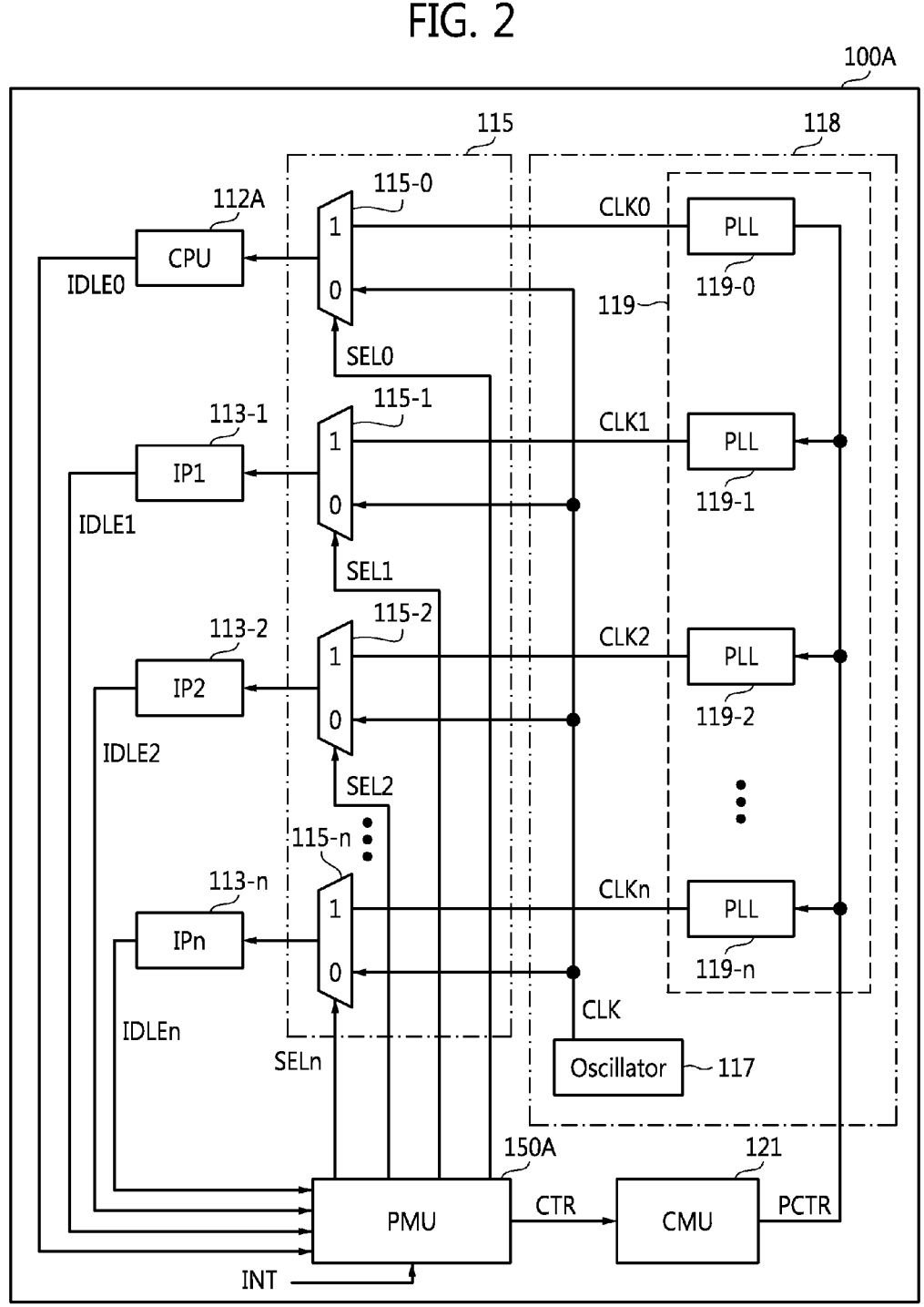
FIG. 2 is a block diagram of an integrated circuit, according to an exemplary embodiment of the inventive concept.

FIG. 2 is a block diagram of an integrated circuit corresponding to the integrated circuit 100 illustrated in FIG. 1, according to an exemplary embodiment. Referring to FIG. 2, an integrated circuit 100A includes a CPU 112A, a plurality of IPs 113-1 through 113-n (where "n" is a natural number of at least 2), a selection circuit 115, a clock signal generator 118, a clock management unit or clock manager (CMU) 121, and a hardware PMU 150A.

The CPU 112A and some of the IPs 113-1 through 113-n may be classified as first type IPs and the rest of the IPs 113-1 through 113-n may be classified as second type IPs. In other words, the type of each of the CPU 112A and the IPs 113-1 through 113-n may be determined based on information set in a register 153A illustrated in FIG. 5. As described above, a first type IP may receive a clock signal or an oscillation clock signal, whereas a second type IP may receive only a clock signal.

Each of the CPU 112A and the IPs 113-1 through 113-n may be formed in a corresponding one of the clock domains 110-1 through 110-8 illustrated in FIG. 1. For example, a first type IP may be formed in one of the first clock domains 110-1 through 110-6 and a second type IP may be formed in one of the second clock domains 110-7 and 110-8. A first clock domain may be changed to a second clock domain and vice versa in other embodiments.

A clock signal supply control circuit may supply clock signals CLK0 through CLKn to the CPU 112A and the IPs 113-1 through 113-n, respectively, or supply an oscillation clock signal CLK to the CPU 112A and the IPs 113-1 through 113-n based on selection signals SEL0 through SELn output from the hardware PMU 150A.

For example, during a normal operation, the clock signal supply control circuit may apply the clock signals CLK0 through CLKn to the CPU 112A and the IPs 113-1 through 113-n, respectively, based on the selection signals SEL0 through SELn, respectively, output from the hardware PMU 150A. At this time, the selection signals SEL0 through SELn may be at a first level (e.g., a high level).

However, in system idle, the clock signal supply control circuit may apply the oscillation clock signal CLK to the CPU 112A and the IPs 113-1 through 113-n based on the selection signals SEL0 through SELn, respectively, output from the hardware PMU 150A. At this time, the selection signals SEL0 through SELn may be at a second level (e.g., a low level).

The clock signal supply control circuit may include a selection circuit 115, a clock signal generator 118, and a clock management unit (CMU) 121 in some embodiments, but the inventive concept is not restricted to these embodiments.

The CPU 112A may transmit an idle signal IDLE0 to the hardware PMU 150A. The IPs 113-1 through 113-$n$ may respectively transmit idle signals IDLE1 through IDLEn to the hardware PMU 150A. For example, each of the idle signals IDLE0 through IDLEn may be transmitted to the hardware PMU 150A through a corresponding exclusive (or dedicated) line.

The hardware PMU 150A may determine whether system idle has been entered based on the idle signal IDLE0 and may generate the selection signals SEL0 through SELn and first control signals CTR based on the determination result. Alternatively, the hardware PMU 150A may determine whether system idle has been entered based on the idle signals IDLE0 through IDLEn and may generate the selection signals SEL0 through SELn and the first control signals CTR according to the determination result.

The selection circuit 115 may include a plurality of selectors 115-0 through 115-$n$. The selector 115-0 may output the clock signal CLK0 or the oscillation clock signal CLK to the CPU 112A in response to the selection signal SEL0. The selectors 115-1 through 115-$n$ may output the clock signals CLK1 through CLKn, respectively, or the oscillation clock signal CLK to the IPs 113-1 through 113-$n$, respectively, in response to the selection signals SEL1 through SELn, respectively.

The clock signal generator 118 includes an oscillator 117 and phase-locked loops (PLLs) 119-0 through 119-$n$. The oscillator 117 generates the oscillation clock signal CLK. The PLLs 119-0 through 119-$n$ may generate the clock signals CLK0 through CLKn, respectively, using the oscillation clock signal CLK. The clock signals CLK0 through CLKn have different frequencies from one another.

The CMU 121 may generate second control signals PCTR for controlling the operation (e.g., on or off) of the PLLs 119-0 through 119-$n$ in response to the first control signals CTR. At least one of the PLLs 119-0 through 119-$n$ may be turned on (or enabled) in response to the second control signals PCTR.

As described above, during a normal operation, the CPU 112A and the IPs 113-1 through 113-$n$ do not generate the idle signals IDLE0 through IDLEn. Accordingly, the hardware PMU 150A outputs the selection signals SEL0 through SELn at the first level (i.e., the high level) and outputs the first control signals CTR instructing to maintain.

The clock signals CLK0 through CLKn are applied by the selectors 115-0 through 115-$n$, respectively, to the CPU 112A and the IPs 113-1 through 113-$n$, respectively. At this time, the CMU 121 generates the second control signals PCTR for maintaining the on-state of the PLLs 119-0 through 119-$n$ in response to the first control signals CTR instructing to maintain.

However, in system idle, the CPU 112A and the IPs 113-1 through 113-$n$ generates the idle signals IDLE0 through IDLEn. Accordingly, the hardware PMU 150A outputs the selection signals SEL0 through SELn at the second level (i.e., the low level) and outputs the first control signals CTR instructing to turn off the PLLs 119-0 through 119-$n$. For example, the first control signals CTR may be transmitted in series or parallel to the CMU 121.

The oscillation clock signal CLK is applied by the selectors 115-0 through 115-$n$ to the CPU 112A and the IPs 113-1 through 113-$n$. Thereafter, the CMU 121 generates the second control signals PCTR for turning off the PLLs 119-0 through 119-$n$ in response to the first control signals CTR instructing to turn off. Accordingly, after the oscillation clock signal CLK is applied to the CPU 112A and the IPs 113-1 through 113-$n$, the PLLs 119-0 through 119-$n$ are turned off to reduce power consumption.

When an interrupt signal INT is input to the hardware PMU 150A, the hardware PMU 150A generates the first control signals CTR instructing to turn on. The CMU 121 generates the second control signals PCTR for turning on the PLLs 119-0 through 119-$n$ in response to the first control signals CTR instructing to turn on.

After generating the first control signals CTR instructing to turn on, the hardware PMU 150A generates the selection signals SEL0 through SELn at the first level. The hardware PMU 150A may determine the generation timing of the selection signals SEL0 through SELn taking the lock time of the PLLs 119-0 through 119-$n$ into account.

Control signals may include the selection signals SEL0 through SELn, the first control signals CTR, and the second control signals PCTR. As described above, in system idle, the clock signal supply control circuit may output the oscillation clock signal CLK instead of the clock signals CLK0 through CLKn applied to the CPU 112A and the IPs 113-1 through 113-$n$ into.

Figure 3:
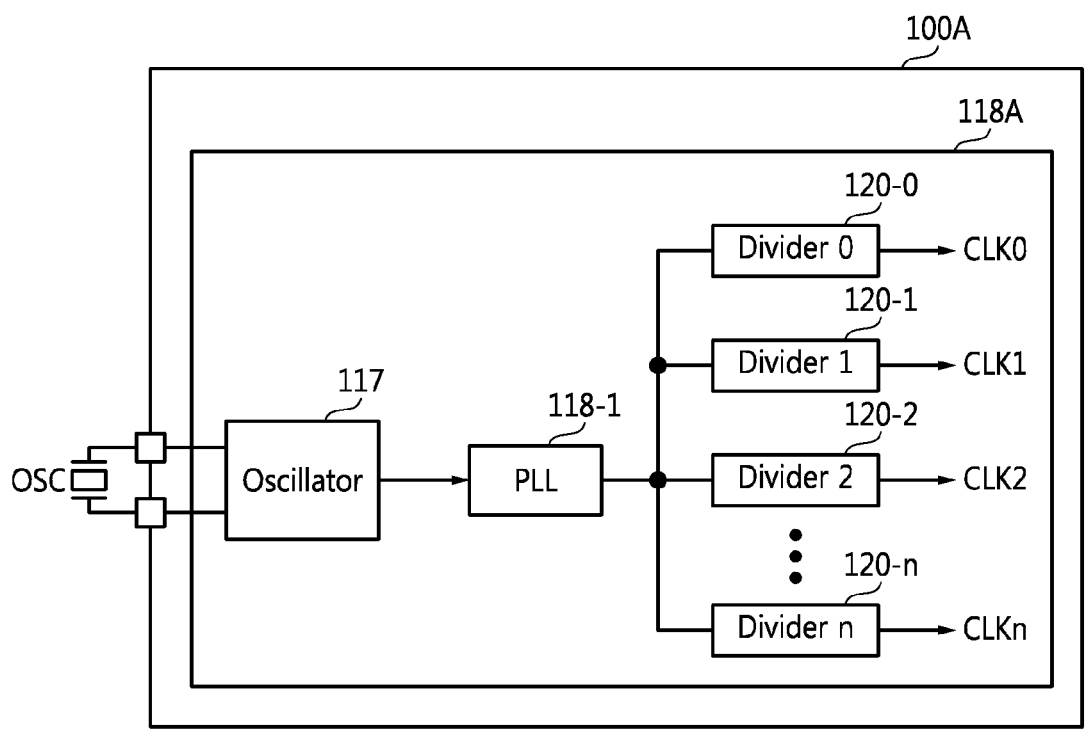
FIG. 3 is a diagram of a clock signal generator, according to an exemplary embodiment of the inventive concept.

FIG. 3 is a diagram of a clock signal generator corresponding to the clock signal generator 118 illustrated in FIG. 2, according to an exemplary embodiment. Referring to FIG. 3, the oscillator 117 of the clock signal generator 118A may generate an oscillation signal using a clock signal output from a crystal oscillator OSC connected to the integrated circuit 100A. A PLL 118-1 may generate a clock signal using the oscillation clock signal. Frequency dividers 120-0 through 120-$n$ divide the frequency of the clock signal output from the PLL 118-1 to generate the clock signals CLK0 through CLKn, respectively. The frequencies of the respective clock signals CLK0 through CLKn may be different from one another.

Figure 4:
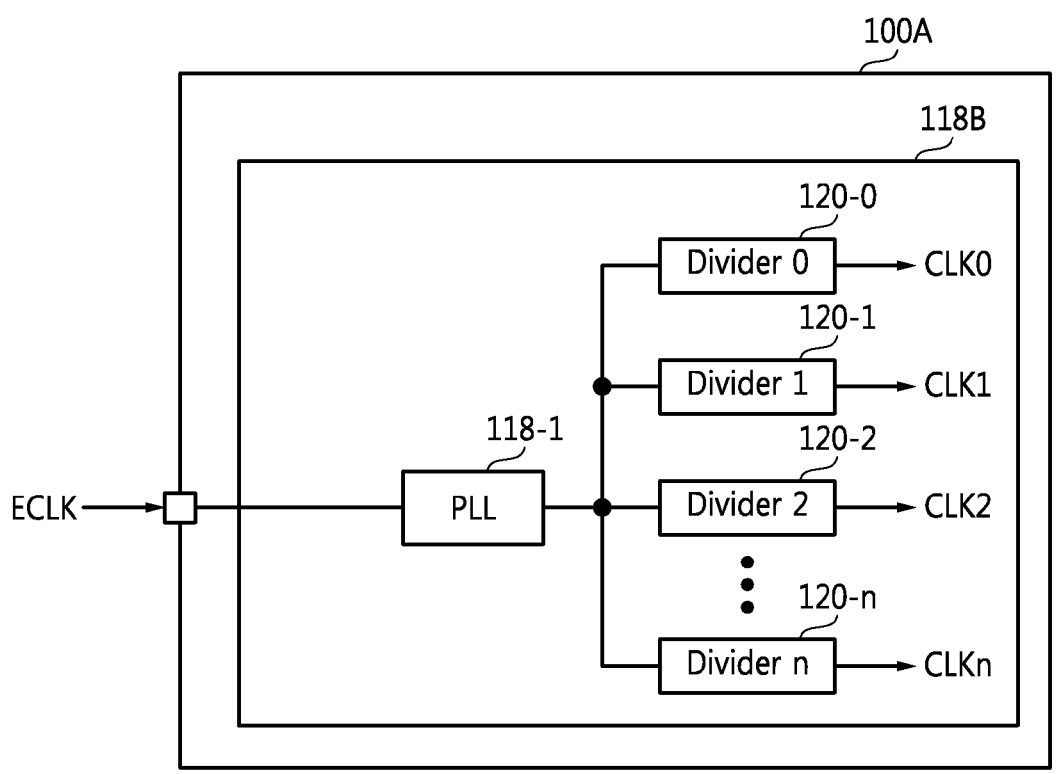
FIG. 4 is a diagram of a clock signal generator, according to another exemplary embodiment of the inventive concept.

FIG. 4 is a diagram of a clock signal generator corresponding to the clock signal generator 118 illustrated in FIG. 2, according to an exemplary embodiment. Referring to FIG. 4, the PLL 118-1 of the clock signal generator 118B may generate a clock signal using an external clock signal ECLK from an outside of the integrated circuit 100A. The external clock signal ECLK may be received through a pin or a pad. The frequency dividers 120-0 through 120-$n$ divide the frequency of the clock signal output from the PLL 118-1 to generate the clock signals CLK0 through CLKn, respectively. The frequencies of the respective clock signals CLK0 through CLKn may be different from one another.

Figure 5:
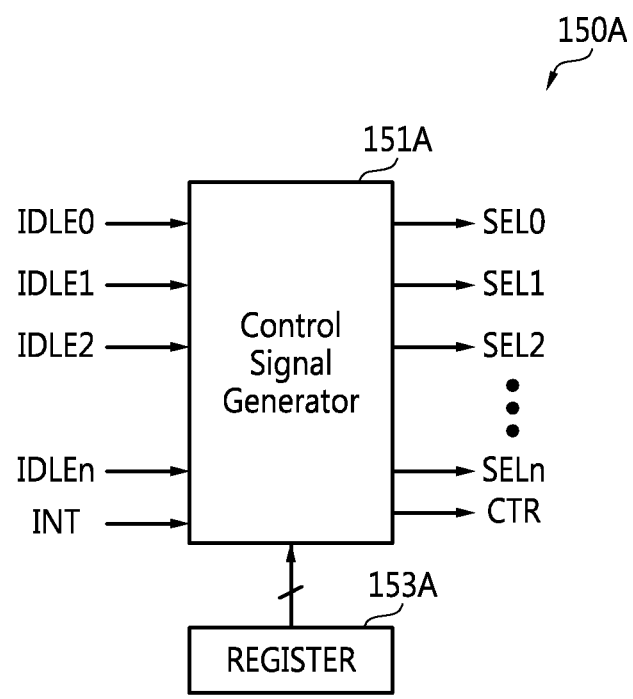
FIG. 5 is a block diagram of a power management unit (PMU), according to an exemplary embodiment of the inventive concept.

FIG. 5 is a block diagram of the hardware PMU150A illustrated in FIG. 2. Referring to FIGS. 2 and 5, the hardware PMU 150A may include a control signal generator 151A and a register 153A. For example, the control signal generator 151A may be a state machine.

The control signal generator 151A may generate the selection signals SEL0 through SELn and the first control signals CTR according to the idle signal IDLE0 output from the CPU 112A and information set in the register 153A. The register 153A may store a bit (e.g., "1" (or data "1") or "0" (or data "0")) corresponding to each of the CPU 112A and the IPs 113-1 through 113-$n$.

For example, when bits respectively corresponding to the CPU 112A and the IPs 113-1 through 113-$n$ are all "1", the hardware PMU 150A may output the selection signals SEL0 through SELn at the second level (e.g., having a value of "0") and may output the first control signals CTR instructing to turn off all of the PLLs 119-0 through 119-n to the CMU 121 in system idle. The selectors 115-0 through 115-n transmit the oscillation clock signal CLK to the CPU 112A and the IPs 113-1 through 113-n, respectively. Thereafter, all of the PLLs 119-0 through 119-n are turned off in response to the second control signals PCTR from the CMU 121. At this time, the CPU 112A and the IPs 113-through 113-n operate as first type IPs.

However, when bits respectively corresponding to the CPU 112A and the IPs 113-2 through 113-n are "1" and a bit corresponding to the IP 113-1 is "0", the hardware PMU 150A may output the selection signals SEL0 and SEL2 through SELn at the second level, the selection signal SEL1 at the first level (e.g., having a value of "1"), and the first control signals CTR instructing to turn off rest PLLs 119-0 and 119-2 through 119-n except for the PLL 119-1. Accordingly, the selectors 115-0 and 115-2 through 115-n transmit the oscillation clock signal CLK to the CPU 112A and the IPs 113-2 through 113-n, respectively, but the selector 115-1 transmits the clock signal CLK1 to the IP 113-1. Thereafter, the rest PLLs 119-0 and 119-2 through 119-n except for the PLL 119-1 are turned off in response to the second control signals PCTR from the CMU 121. In this case, the CPU 112A and the IPs 113-2 through 113-n operate as first type IPs and the IP 113-1 operates as a second type IP. For example, IP 113-1 may be formed in the second clock domain 110-7 or 110-8.

Alternatively, the control signal generator 151A may generate the selection signals SEL0 through SELn and the first control signals CTR according to the idle signals IDLE0 through IDLEn respectively from the CPU 112A and the IPs 113-1 through 113-n and information set in the register 153A. The register 153A may store a bit (e.g., "1" or "0") corresponding to each of the CPU 112A and the IPs 113-1 through 113-n.

For example, when bits respectively corresponding to the CPU 112A and the IPs 113-1 through 113-n are all "1", the hardware PMU 150A may output the selection signals SEL0 through SELn at the second level to the selection circuit 115 and may output the first control signals CTR instructing to turn off all of the PLLs 119-0 through 119-n to the CMU 121.

Accordingly, the selectors 115-0 through 115-n transmit the oscillation clock signal CLK to the CPU 112A and the IPs 113-1 through 113-n, respectively. Thereafter, all of the PLLs 119-0 through 119-n are turned off in response to the second control signals PCTR from the CMU 121. In this case, the CPU 112A and the IPs 113-through 113-n operate as first type IPs, respectively.

However, when bits respectively corresponding to the CPU 112A and the IPs 113-2 through 113-n are "1" and a bit corresponding to the IP 113-1 is "0", the hardware PMU 150A may output the selection signals SEL0 and SEL2 through SELn at the second level and the selection signal SEL1 at the first level to the selection circuit 115 and output the first control signals CTR instructing to turn off the rest PLLs 119-0 and 119-2 through 119-n except for the PLL 119-1 to the CMU 121.

Accordingly, the selectors 115-0 and 115-2 through 115-n transmit the oscillation clock signal CLK to the CPU 112A and the IPs 113-2 through 113-n, respectively, but the selector 115-1 transmits the clock signal CLK1 to the IP 113-1. Thereafter, the rest PLLs 119-0 and 119-2 through 119-n except for the PLL 119-1 are turned off in response to the second control signals PCTR from the CMU 121. In this case, the CPU 112A and the IPs 113-2 through 113-n operate as first type IPs and the IP 113-1 operates as a second type IP.

Figure 6:
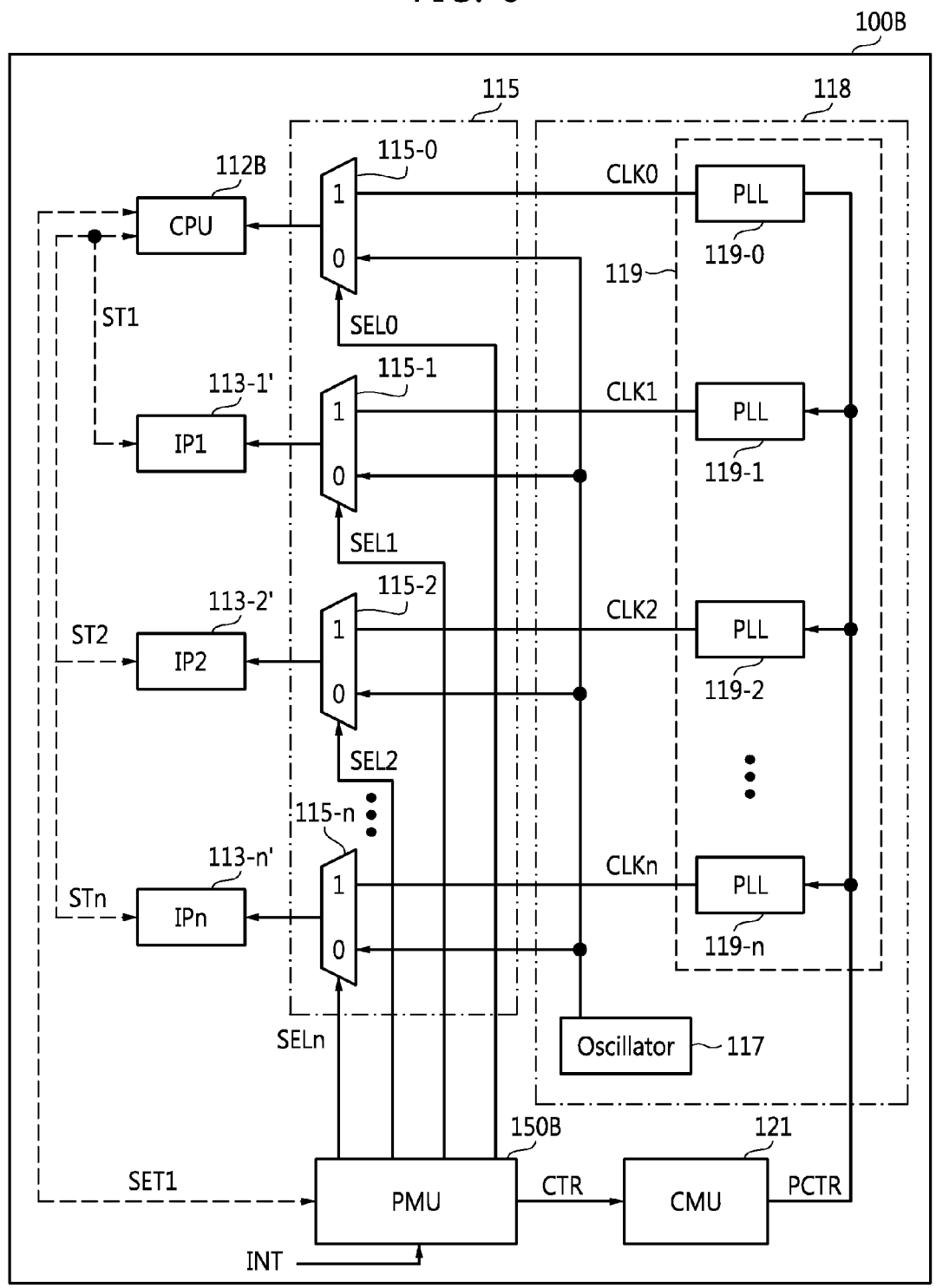
FIG. 6 is a block diagram of an integrated circuit, according to another exemplary embodiment of the inventive concept.

FIG. 6 is a block diagram of an integrated circuit corresponding to the integrated circuit 100 illustrated in FIG. 1, according to another exemplary embodiment. Referring to FIG. 6, the integrated circuit 100B includes a CPU 112B, a plurality of IPs 113-1' through 113-n', a selection circuit 115, a clock signal generator 118, a CMU 121, and a hardware PMU 150B. For example, the IP 113-1 or 113-1' may be a GPU, the IP 113-2 or 113-2' may be a wired interface, and the IP 113-n or 113-n' may be a video module in some embodiments, but the inventive concept is not restricted to these embodiments.

The CPU 112B may monitor the operating states of the respective IPs 113-1' through 113-n' and may detect the operating states of the IPs 113-1' through 113-n' based on monitoring information ST1 through STn. An operating state may be, for example, a run state or an idle state. The CPU 112B may detect whether each of the IPs 113-1' through 113-n' is in an idle state based on the operating state of each IP. The CPU 112B detects whether each of the CPU 112B and the IPs 113-1' through 113-n' is in the idle state and transmits an idle signal or state information SET1 to the hardware PMU 150B according to the detection result.

Figure 7:
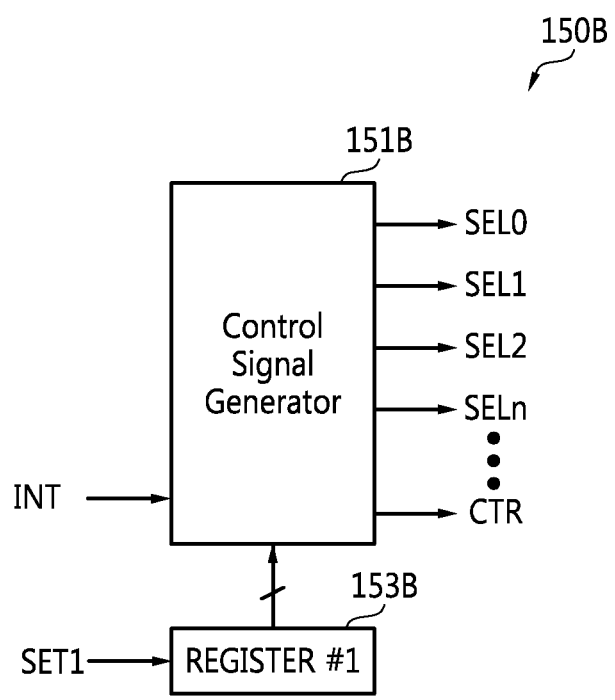
FIG. 7 is a block diagram of a PMU, according to another exemplary embodiment of the inventive concept.

FIG. 7 is a block diagram of the hardware PMU 150B illustrated in FIG. 6. Referring to FIGS. 6 and 7, the CPU 112B or software (or firmware) executed in the CPU 112B may detect whether each of the CPU 112B and the IPs 113-1' through 113-n' is in an idle state and may set the idle signal or state information SET1 in a register 153B.

The hardware PMU 150B includes a control signal generator 151B and the register 153B. The control signal generator 151B may be a state machine. The control signal generator 151B may generate the selection signals SEL0 through SELn and the first control signals CTR using the state information SET1 set in the register 153B. The register 153B may store a bit (e.g., "1" or "0") corresponding to each of the CPU 112B and the IPs 113-1' through 113-n'.

For example, when bits respectively corresponding to the CPU 112B and the IPs 113-1' through 113-n' are all "1", the hardware PMU 150B may output the selection signals SEL0 through SELn having a value of "0" to the selection circuit 115 and may output the first control signals CTR instructing to turn off all of the PLLs 119-0 through 119-n to the CMU 121. The selectors 115-0 through 115-n transmit the oscillation clock signal CLK to the CPU 112B and the IPs 113-1' through 113-n', respectively. Thereafter, all of the PLLs 119-0 through 119-n are turned off in response to the second control signals PCTR output from the CMU 121. In this case, the CPU 112B and the IPs 113-1' through 113-n' operate as first type IPs.

However, when bits respectively corresponding to the CPU 112B and the IPs 113-2' through 113-n' are "1" and a bit corresponding to the IP 113-1' is "0", the hardware PMU 150B may output the selection signals SEL0 and SEL2 through SELn having a value of "0" and the selection signal SEL1 having a value of "1" to the selection circuit 115 and may output the first control signals CTR instructing to turn off the rest PLLs 119-0 and 119-2 through 119-n except for the PLL 119-1 to the CMU 121.

The selectors 115-0 and 115-2 through 115-n transmit the oscillation clock signal CLK to the CPU 112B and the IPs 113-2' through 113-n', respectively, but the selector 115-1 transmits the clock signal CLK1 to the IP 113-1'. Thereafter, the rest PLLs 119-0 and 119-2 through 119-n except for the PLL 119-1 are turned off in response to the second control signals PCTR output from the CMU 121. In this case, the CPU 112B and the IPs 113-2' through 113-n' operate as first type IPs and the IP 113-1' operates as a second type IP.

Alternatively, the CPU 112B may determine whether each of power domains including any one of the IPs 113-1' through 113-n' is power-gated and transmit the idle signal or state information SET1 to the hardware PMU 150B. Whether the power domain is power-gated means whether power to the power domain is supplied or cut off. The corresponding power domain may include one or more IPs.

Figure 8:
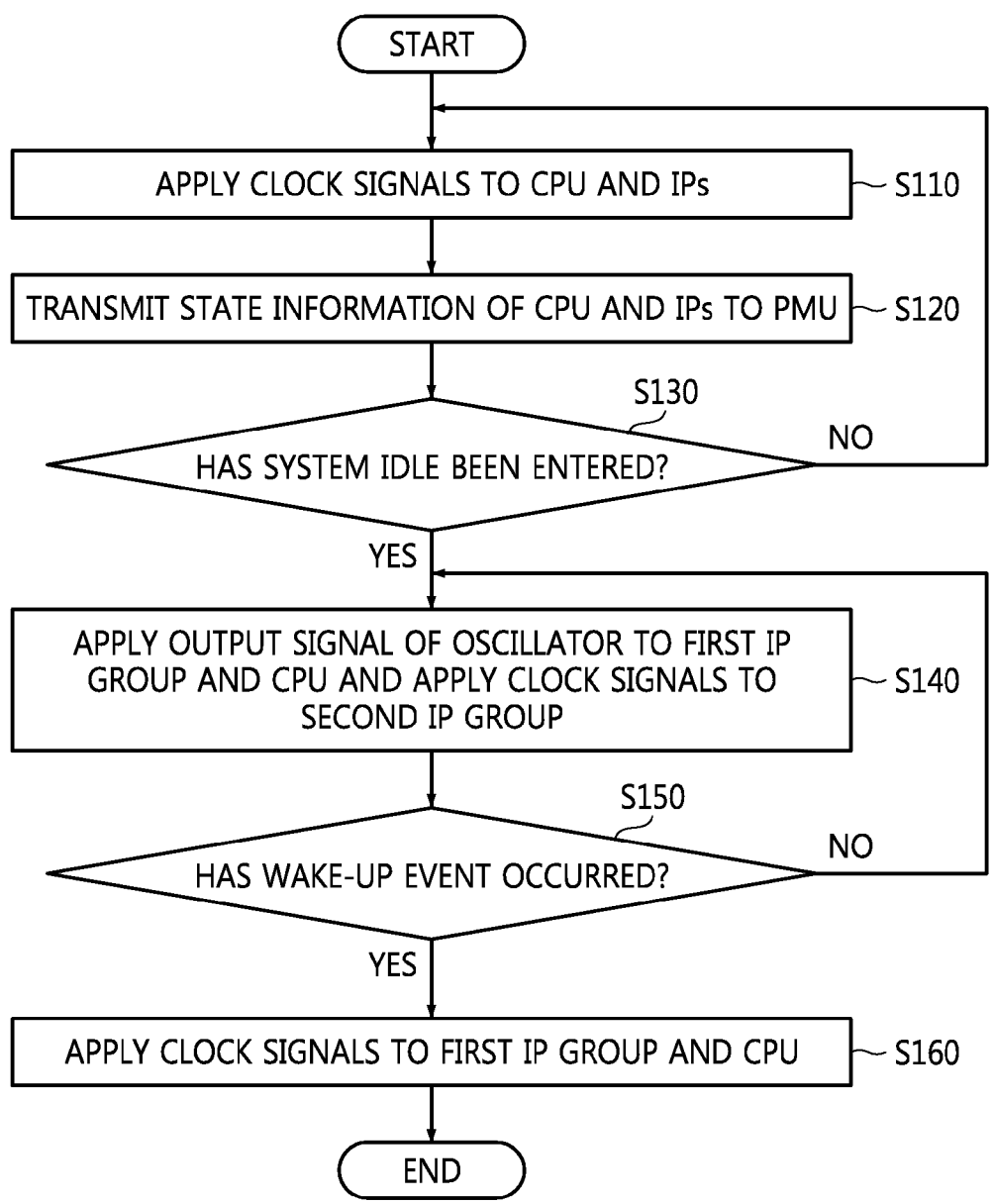
FIG. 8 is a flowchart of an operation of an integrated circuit, according to some exemplary embodiments of the inventive concept.

FIG. 8 is a flowchart of the operation of the integrated circuit 100A illustrated in FIG. 2 according to some exemplary embodiments. The clock signal supply control circuit applies the clock signals CLK0 through CLKn to the CPU 112A and the IPs 113-1 through 113-n, respectively, in operation S110.

The CPU 112A and the IPs 113-1 through 113-n transmit their respective state information to the hardware PMU 150A in operation S120. The state information may be the idle signal IDLE0 and idle signals IDLE1 through IDLEn.

The hardware PMU 150A determines whether system idle has been entered based on the state information in operation S130. When system idle has not been entered, the clock signal supply control circuit performs operation S110. However, when system idle has been entered, the hardware PMU 150A generates the selection signals SEL0 through SELn and the first control signals CTR based on the state information and information stored in the register 153A.

The clock signal supply control circuit applies the output signal CLK of the oscillator 117 to a first IP group of some of the IPs 113-1 through 113-n and the CPU 112A and applies clock signals output from PLLs to a second IP group of the rest of the IPs 113-1 through 113-n in operation S140. At this time, IPs in the first IP group and the CPU 112A may be first type IPs and IPs in the second IP group may be second type IPs.

When the interrupt signal INT is not input to the hardware PMU 150A in operation S150, the clock signal supply control circuit performs operation S140. However, when the interrupt signal INT is input to the hardware PMU 150A in operation S150, that is, when a wake-up event occurs, the control signal generator 151A outputs the first control signals CTR for turning on at least one of the PLLs 119-0 through 119-n that has been off to the CMU 121. At least one of the PLLs 119-0 through 119-n is turned on in response to the second control signals PCTR output from the CMU 121.

When a lock time for the at least one of the PLLs 119-0 through 119-n, which has been on, elapses, the hardware PMU 150A outputs at least one corresponding selection signal to the selection circuit 115. Accordingly, the clock signal supply control circuit applies not the output signal CLK of the oscillator 117 but clock signals from PLLs that have been turned on to the first IP group and the CPU 112A in operation S160.

FIG. 9 is a flowchart of the operation of the integrated circuit 110B illustrated in FIG. 6 according to some exemplary embodiments. The clock signal supply control circuit applies the clock signals CLK0 through CLKn to the CPU 112B and the IPs 113-1' through 113-n', respectively.

The CPU 112B detects or determines an operating state of each of the CPU 112B and the IPs 113-1' through 113-n' (for example, the CPU 112B detects whether each of the CPU 112B and the IPs 113-1' through 113-n' is in an idle state) and transmits the idle signal or state information SET1 to the hardware PMU 150B in operation S210. In other words, the CPU 112B stores the idle signal or state information SET1 in the register 153B of the hardware PMU 150B in operation S210. The hardware PMU 150B determines whether system idle has been entered based on the idle signal or state information SET1 stored in the register 153B in operation S220.

When system idle has been entered, the hardware PMU 150B generates the selection signals SEL0 through SELn and the first control signals CTR based on the idle signal or state information SET1 stored in the register 153B. The clock signal supply control circuit applies the output signal CLK of the oscillator 117 to a first IP group of some of the IPs 113-1' through 113-n' and the CPU 112B and applies corresponding clock signals output from PLLs to a second group of the rest of the IPs 113-1' through 113-n' in operation S230. At this time, IPs in the first IP group and the CPU 112B may be first type IPs and IPs in the second IP group may be second type IPs.

When the interrupt signal INT is not input to the hardware PMU 150B in operation S240, the clock signal supply control circuit performs operation S230. However, when the interrupt signal INT is input to the hardware PMU 150B in operation S240, that is, when a wake-up event occurs, the control signal generator 151B outputs the first control signals CTR for turning on at least one of the PLLs 119-0 through 119-n that has been off to the CMU 121. At least one of the PLLs 119-0 through 119-n is turned on in response to the second control signals PCTR output from the CMU 121.

When a lock time for the at least one of the PLLs 119-0 through 119-n, which has been on, elapses, the hardware PMU 150B outputs at least one corresponding selection signal to the selection circuit 115. Accordingly, the clock signal supply control circuit applies not the output signal CLK of the oscillator 117 but clock signals from PLLs that have been turned on to the first IP group and the CPU 112B in operation S250.

FIG. 10 is a flowchart of the operation of the integrated circuit 100B illustrated in FIG. 6 according to other exemplary embodiments. The CPU 112B stores the idle signal or state information SET1, which indicates whether each of power domains including any of the IPs 113-1' through 113-n' has been power-gated, to the hardware PMU 150B in operation S310. In other words, the CPU 112B stores the idle signal or state information SET1 in the register 153B of the hardware PMU 150B in operation S310.

The clock signal supply control circuit applies the clock signals CLK0 through CLKn to the CPU 112B and the IPs 113-1' through 113-n', respectively, in operation S320. The hardware PMU 150B determines whether system idle has been entered based on the idle signal or state information SET1 stored in the register 153B in operation S330. When system idle has been entered, the hardware PMU 150B generates the selection signals SEL0 through SELn and the first control signals CTR based on the idle signal or state information SET1.

The clock signal supply control circuit applies the output signal CLK of the oscillator 117 to a first IP group of some of the IPs 113-1' through 113-n' and the CPU 112B and applies corresponding clock signals output from PLLs to a second group of the rest of the IPs 113-1' through 113-n' in operation S340. At this time, IPs in the first IP group and the CPU 112B may be first type IPs and IPs in the second IP group may be second type IPs.

When the interrupt signal INT is not input to the hardware PMU 150B in operation S350, the clock signal supply control circuit performs operation S340. However, when the interrupt signal INT is input to the hardware PMU 150B in operation S350, that is, when a wake-up event occurs, the control signal generator 151B outputs the first control signals CTR for turning on at least one of the PLLs 119-0 through 119-n that has been off to the CMU 121. At least one of the PLLs 119-0 through 119-n is turned on in response to the second control signals PCTR output from the CMU 121.

When a lock time for the at least one of the PLLs 119-0 through 119-n, which has been on, elapses, the hardware PMU 150B outputs at least one corresponding selection signal to the selection circuit 115. Accordingly, the clock signal supply control circuit applies not the output signal CLK of the oscillator 117 but clock signals from PLLs that have been turned on to the first IP group and the CPU 112B in operation S360.

As described above, according to some embodiments of the inventive concept, an application processor supplies a clock signal of an oscillator instead of a clock signal used therein by using a hardware PMU when the application processor is in system idle, thereby reducing power consumption.

The operations or steps of the methods or algorithms described above can be embodied as computer readable codes on a computer readable recording medium, or to be transmitted through a transmission medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The transmission medium can include carrier waves transmitted through the Internet or various types of communication channel. The computer readable recording medium can also be distributed over network coupled computer systems so that the computer readable code is stored and executed in a distributed fashion.

At least one of the components, elements or units represented by a block as illustrated in FIGS. 1-7 may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions. Also, at least one of these components, elements or units may further include a processor such as a CPU that performs the respective functions, a microprocessor, or the like. Two or more of these components, elements or units may be combined into one single component, element or unit which perform all operations or functions of the combined two or more components, elements of units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

While the inventive concept has been particularly shown and described with reference to exemplary embodiments thereof, it will be understood by those of ordinary skill in the art that various changes in forms and details may be made therein without departing from the spirit and scope of the inventive concept as defined by the following claims.

What is claimed is:

1. A system on chip (SoC) comprising:
   at least one first type electronic component comprising a central processing unit (CPU);
   at least one second type electronic component;
   a hardware power management unit (PMU) comprising a register, and configured to:
      determine whether the SoC is in a system idle based on an operating state of the at least one first type electronic component; and
      in response to the SoC being determined to be in the system idle, generate a control signal based on type information that is set in the register, the type information indicates type of each of the at least one first type electronic component and the at least one second type electronic component; and
   a clock signal supply control circuit configured to:
      change a first output signal supplied to the at least one first type electronic component from a first clock signal to an oscillation clock signal, based on the control signal; and
      maintain a second output signal supplied to the at least one second type electronic component at a second clock signal, based on the control signal,
   wherein the oscillation clock signal has a frequency lower than that of the first clock signal.

2. The SoC of claim 1, wherein the at least one first type electronic component comprises a plurality of first type electronic components, and
   wherein each of the at least one first type electronic component is configured to transmit an idle signal to the hardware PMU, and
   wherein the hardware PMU is configured to determine operating states of the at least one first type electronic component based on the idle signal from each of the at least one first type electronic component and output the control signal as a result of the determination of the operating states.

3. The SoC of claim 2, further comprising exclusive lines configured to transmit the idle signal from each of the at least one first type electronic component to the hardware PMU.

4. The SoC of claim 1, wherein the at least one first type electronic component comprises a plurality of first type electronic components, and
   wherein the CPU is configured to detect an operating state of the CPU and an operating state of each of other first type electronic components among the at least one first type electronic component and transmit detection information obtained from the detection to the hardware PMU,
   wherein the hardware PMU is configured to determine operating states of the at least one first type electronic component based on the detection information and output the control signal as a result of the determination of the operating states.

5. The SoC of claim 4, wherein the CPU is further configured to set the detection information in the register, and
   wherein the hardware PMU is configured to output the control signal based on the detection information that is set in the register.

6. The SoC of claim 1, wherein the at least one first type electronic component comprises a plurality of first type electronic components, wherein the operating state of each of the at least one first type electronic component except for the CPU indicates whether each of the at least one first type electronic component is power-gated, and wherein the hardware PMU is configured to output the control signal based on an idle signal from the CPU and whether each of the at least one first type electronic component except for the CPU is power-gated.

7. The SoC of claim 1, wherein the clock signal supply control circuit comprises:
an oscillator configured to generate the oscillation clock signal;
a first clock signal generator configured to generate the first clock signal,
a second clock signal generator configured to generate the second clock signal,
wherein the clock signal supply control circuit is further configured to turn off the first clock signal generator after the oscillation clock signal is applied to the at least one first type electronic component.

8. The SoC of claim 7, wherein the clock signal supply control circuit further comprises a plurality of selectors, and
wherein one of the selectors is configured to apply one of the first clock signal and the oscillation clock signal to one of the at least one first type electronic component in response to one of selection signals output from the hardware PMU.

9. The SoC of claim 7, wherein the hardware PMU is further configured to turn on the first clock signal generator, which has been turned off, in response to an interrupt signal and apply the first clock signal to the at least one first type electronic component.

10. The SoC of claim 1, wherein the frequency of the oscillation clock signal is lower than that of the second clock signal.

11. A mobile device comprising:
a system on chip (SoC) comprising an application processor;
a memory connected to the SoC; and
a display connected to the SoC,
wherein the application processor comprises:
a central processing unit (CPU) configured to output a first idle signal;
a first electronic component;
a second electronic component;
a hardware power management unit (PMU) configured to:
determine whether the application processor is in a system idle based on the first idle signal output from the CPU; and
in response to the application processor being determined to be in the system idle, generate a control signal based on type information that is set in a register, the type information indicates type of each of the CPU, the first electronic component and the second electronic component; and
a clock signal supply control circuit configured to:
change a first output signal that is supplied to the CPU and the first electronic component from a first clock signal to an oscillation clock signal, based on the control signal; and
maintain a second output signal supplied to the second electronic component at a second clock signal, based on the control signal,
a memory controller configured to control a first operation of the memory; and
a display controller configured to control a second operation of the display,
wherein the oscillation clock signal has a frequency lower than that of the first clock signal.

12. The mobile device of claim 11, wherein the CPU is further configured to detect whether each of the CPU, the first electronic component, and the second electronic component is in an idle state and transmit the first idle signal to the hardware PMU.

13. The mobile device of claim 12, wherein the CPU is further configured to set the first idle signal in the register, and
wherein the hardware PMU is configured to output the control signal based on the first idle signal that is set in the register.

14. The mobile device of claim 11, wherein the clock signal supply control circuit comprises:
an oscillator configured to generate the oscillation clock signal;
a first clock signal generator configured to generate the first clock signal; and
a second clock signal generator configured to generate the second clock signal,
wherein the clock signal supply control circuit is further configured to turn off the first clock signal generator after the oscillation clock signal is applied to at least one of the CPU and the first electronic component.

15. The mobile device of claim 14, wherein the clock signal supply control circuit further comprises a plurality of selectors, and
wherein one of the plurality of selectors is configured to apply one of the first clock signal and the oscillation clock signal to the first electronic component in response to one of selection signals output from the hardware PMU.

16. An integrated circuit comprising:
a central processing unit (CPU);
a first electronic component;
a second electronic component;
a power manager comprising a register, and configured to:
determine an operating state of any one or any combination of the CPU, the first electronic component, and the second electronic component; and
in response to the operating state being determined to be in a system idle, generate a first control signal of a first level, based on a first bit of the register, the first bit indicating that the CPU is of a first type, generate a second control signal of the first level, based on a second bit of the register, the second bit indicating that the first electronic component is of the first type, and generate a third control signal of a second level, based on a third bit of the register, the third bit indicating that the second electronic component is of a second type; and
a clock signal supply control circuit configured to:
change a first output signal that is supplied to the CPU from a first clock signal to an oscillation clock signal, based on the first control signal;
change a second output signal that is supplied to the first electronic component from a second clock signal to the oscillation clock signal, based on the second control signal; and
maintain a third output signal that is supplied to the second electronic component at a third clock signal, based on the third control signal, wherein the oscillation clock signal has a frequency lower than that of each of the first clock signal, the second clock signal, and the third clock signal.

17. The integrated circuit of claim 16, wherein the power manager is further configured to determine a first operating state of the CPU without determining a second operating state of the first electronic component, and wherein the clock signal supply control circuit is further configured to, in response to the first operating state of the CPU being determined to be in an idle state, supply the oscillation clock signal to the CPU.

18. The integrated circuit of claim 16, wherein the power manager is further configured to determine the operating state of each of the CPU and the second electronic component, and wherein the clock signal supply control circuit is further configured to, in response to the operating state of the CPU being determined to be in an idle state, supply the oscillation clock signal to the CPU, and supply the third clock signal to the second electronic component, regardless of the operating state of the second electronic component.

19. The integrated circuit of claim 18, wherein the CPU is further configured to determine the operating state of the first electronic component, and transmit the operating state of the first electronic component to the power manager so that the power manager determines the operating state of the first electronic component.

* * * * *